June 19, 1923.
M. B. PEEPLES
REENFORCING STRIP FOR TIRES
Filed Dec. 29, 1922
1,459,377
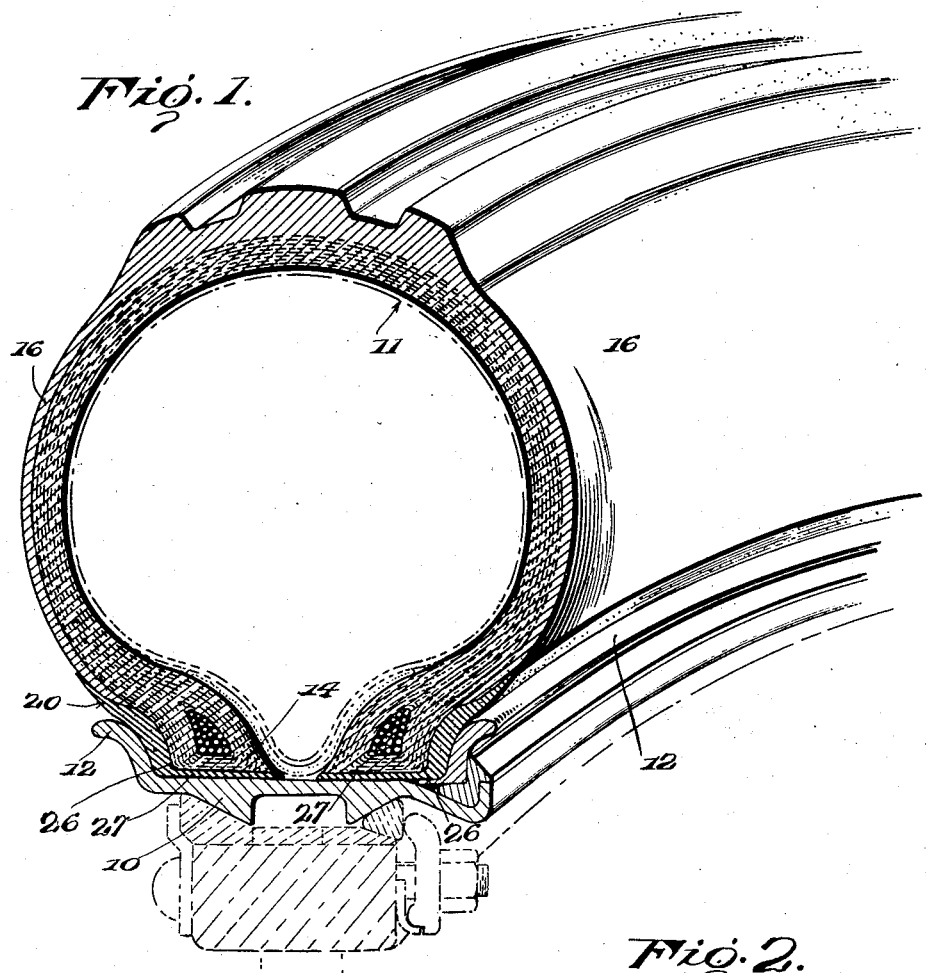
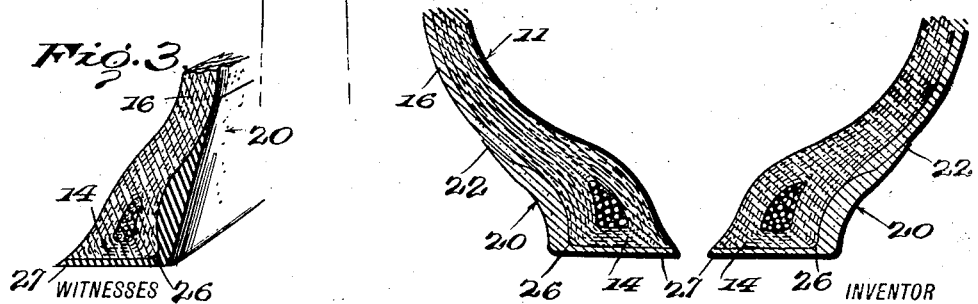
WITNESSES
INVENTOR
Mark B. Peeples.
BY
ATTORNEYS Patented June 19, 1923.

1,459,377

UNITED STATES PATENT OFFICE.

MARK B. PEEPLES, OF SCOTIA, SOUTH CAROLINA.

REENFORCING STRIP FOR TIRES.

Application filed December 29, 1922. Serial No. 609,722.

*To all whom it may concern:*

Be it known that I, MARK B. PEEPLES, a citizen of the United States, and resident of Scotia, in the county of Hampton and State of South Carolina, have invented certain new and useful Improvements in Reenforcing Strips for Tires, of which the following is a specification.

This invention relates to tires and more particularly to a strengthening means therefor.

In the automobile tires now in use the rubber covering on the fabric terminates at a point spaced from the bead of the tire and consequently fabric is exposed to and comes into direct contact with the flanges of the rim with the result that the fabric wears rapidly and in many cases results in rim cuts.

Also the arrangement of the tire on the rim leaves a slight space in which sand and water lodges and consequently the bead of the tire wears very rapidly.

Therefore an important object of this invention is to provide a strengthening or reenforcing strip between the flange of the rim and the bead of the tire so that the flange cannot come in direct contact with the bead of the tire and so as to effectively exclude sand, water and the like.

A further object is to provide a reenforcing strip which may be applied to the tire by a vulcanizing process or which may be placed in position at the proper place and remains separate from the tire.

Other objects and advantages of the invention will be apparent during the course of the following description.

In the accompanying drawing, forming a part of this application and in which like numerals are employed to designate like parts throughout the same, Figure 1 is a sectional perspective of a tire equipped with the improved strengthening strip, the strip being shown compressed.

Figure 2 is a detail transverse sectional view through the tire equipped with the improved strips.

Figure 3 is a fragmentary perspective of the strip applied to a tire and in its normal position.

In the drawing wherein for the purpose of illustration is shown a preferred embodiment of the invention, the numeral 10 designates a rim upon which a tire casing 11 is mounted and as illustrated in Figure 1 the rim is provided with the usual flanges 12 between which the beads 14 of the casing or shoe are arranged.

Figures 1 and 2 illustrate that the rubber covering 16 which is applied to the crown of the tire terminates at a point spaced from the inner edge or bead of the tire and consequently the canvas or fabric arranged at the edge of the tire is exposed to and comes into direct contact with the iron flanges 12. Therefore, the fabric wears rapidly and due to this hard surface which is presented to the iron flanges 12 slight spaces are left with the result that sand and water may lodge between the flanges and the bead of the tire, all of which causes the tire to wear rapidly.

To overcome this disadvantage I have provided cushioning strips or strengthening strips 20 of rubber or other yieldable material and it will be seen that the upper edge of each strip tapers to a point as indicated at 22 and overlaps the adjacent portion of the rubber covering 16 so as to prevent the lower edges of the covering 16 from becoming detached from the fabric body.

Also in case the reenforcing strips 20 are vulcanized to the casing a secure connection between the parts is obtained due to the fact that the upper edge portion of the strip 20 overlaps the strip 16 for a substantial distance.

Normally the strip 20 is of the shape illustrated in Figure 3 wherein the outer side of the strip is shown as being perfectly flat while the inner side is bulged substantially. Therefore, when the tire and the strip are applied as illustrated in Figure 1 the flanges 12 will bear against the outer side of the strip and cause the strip to completely fill the space between the beads and the flanges. In case any side movement of the tire takes place on the rim due to the turning of the vehicle the strip will vary in thickness so as to completely close the space between the flanges and the beads.

Also in case the tire is under-inflated the second intermediate portions of the strip 20 will completely fill the space if any between the beads and the flanges and the lateral movement of the tire on the rim will be compensated for by the elasticity of the strip.

The drawings illustrate that the inner edge of each strip is provided with an inwardly extending rubber base flange which underlies the adjacent bead and prevents the tire from easily moving on the rim. The frictional contact between the base flange 27 and the bead of the tire will render easy movement of the tire unlikely.

Furthermore the base flange 27 which extends to the inner edge of the bead effectively spaces the bead of the tire from the flange and consequently the bead cannot rust to the rim.

When the strip is applied to the casing as illustrated in Figures 1 and 2 it spaces the fabric body from direct contact with the iron flanges 12 and consequently the iron flanges cannot rapidly wear the body. Also the strips 12 are of a yieldable material such as rubber so that the same will take up any space which would otherwise be left between the beads and the flanges 12. Due to the provision of the rubber strip 20 sand and water cannot lodge between the flanges and the beads of the tire.

Attention is directed to the fact that the rubber reenforcing strip 20 extends beyond the edges of the flanges 12 so that the edges of the flange cannot cut into the rim.

Having thus described the invention, what is claimed is:—

1. The combination of a tire casing having a fabric body, beads at the edges of the fabric body and a rubber covering terminating short of the beads; and a protecting and reenforcing strip of rubber applied to the outer sides of the beads of the tire and having their upper edges tapered and overlapped with the edges of the rubber covering, the inner edges of the protecting and reenforcing strips being formed with flanges underlying the beads of the tire.

2. A protecting and reenforcing strip for tires comprising a yieldable annular rubber body adapted to be applied to the side of the bead of a tire, and having its upper edge tapered to overlap and protect the edge of the rubber covering of the tire, said annular rubber body being yieldable and constituting a means to space the flange of the rim from engagement with the fabric bead of the tire and to exclude foreign matter from between the flange of the rim and the tire bead, the lower edge of the strip being provided with a wide inwardly directed base flange to underlie the bead of the tire, the inner surface of the rubber body being bulged substantially.

MARK B. PEEPLES.